(12) United States Patent
Oliveira et al.

(10) Patent No.: US 8,183,182 B2
(45) Date of Patent: May 22, 2012

(54) COMPOSITION OF MICROEMULSION AND METHOD FOR ADVANCED RECOVERY OF HEAVY OIL

(75) Inventors: Marcia Cristina Khalil Oliveira, Rio de Janeiro (BR); Gaspar Gonzalez Maldonado, Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 347 days.

(21) Appl. No.: 12/487,322

(22) Filed: Jun. 18, 2009

(65) Prior Publication Data
US 2010/0006286 A1 Jan. 14, 2010

(30) Foreign Application Priority Data

Jul. 9, 2008 (BR) ...................................... 0802390

(51) Int. Cl.
*C09K 8/68* (2006.01)
*C09K 8/584* (2006.01)
*B01F 3/08* (2006.01)

(52) U.S. Cl. ........ 507/203; 507/254; 507/261; 507/266; 507/938; 516/25; 516/28; 516/58; 516/72

(58) Field of Classification Search ................... 507/203, 507/254, 261, 266, 938; 516/25, 28, 58, 516/72
See application file for complete search history.

(56) References Cited

U.S. PATENT DOCUMENTS

| | | |
|---|---|---|
| 3,983,940 A | 10/1976 | Carpenter, Jr. et al. |
| 4,008,769 A | 2/1977 | Chang |
| 4,240,504 A | 12/1980 | Reed |

*Primary Examiner* — Timothy J. Kugel
(74) *Attorney, Agent, or Firm* — Sughrue Mion, PLLC

(57) ABSTRACT

A composition of a microemulsion including a mixture of a combination of surfactants and co-surfactants, an oil phase and an aqueous phase is described. In addition, a method for the advanced recovery of heavy oils is described which includes the steps of injecting a bank containing a microemulsion composition, injecting a bank of a polymer solution, and injecting water. The microemulsion composition can be applied in arenitic and carbonatic reservoirs, containing oils with API below 22.3° API, in both onshore and offshore fields.

8 Claims, 1 Drawing Sheet

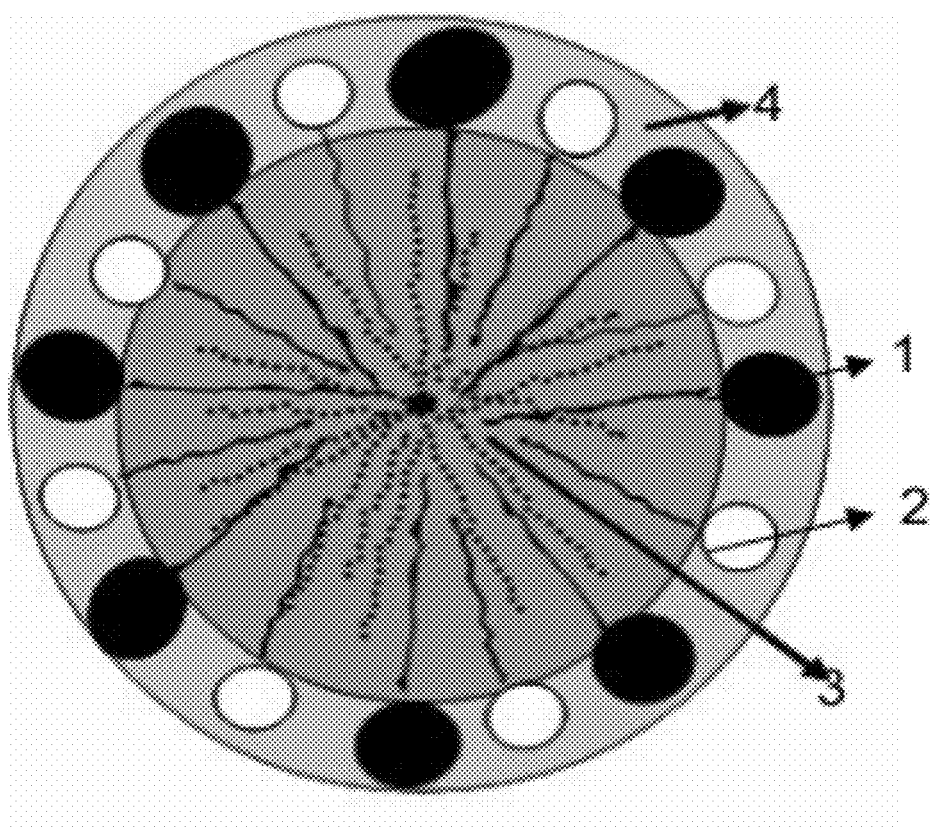

COMPOSITION OF MICROEMULSION AND METHOD FOR ADVANCED RECOVERY OF HEAVY OIL

FIELD OF THE INVENTION

This invention is related to the field of chemical compositions applied in techniques for the recovery of oil. More specifically, this invention describes a composition of a microemulsion and a method that employs the composition in the advanced recovery of heavy oil.

BACKGROUND

Even after the use of so-called conventional methods of oil recovery, such as water injection and the immiscible injection of gas, a large part by volume of the original amount of oil in an oil deposit remains in the reservoir rock, having not been recovered.

In the case of reservoirs containing oils having a high viscosity, the use of these conventional methods of recovery does not provide satisfactory results. The high viscosity of the oil is an obstacle to its movement within the porous medium, while the injected fluid, water, or gas has a much greater mobility. This results in low coverage efficiencies and, as a result, normally very low or practically non-existent additional recovery. Similarly, high interfacial tension between the water and the oil lead to the retention of high quantities of oil in the region invaded by the water. The injected fluid thus does not succeed in withdrawing the oil from the pores of the reservoir, and gives low transport efficiencies as a result.

These are the two principal aspects that interfere in the processes of transport of fluid by fluid, and consequently are the points of operation of the special methods for recovery, which are also referred to as advanced recovery methods. These advanced recovery methods can be separated into thermal, chemical, and biological methods. Among the chemical methods used to improve the recovery factor of reservoirs with a high water flow, the injection of microemulsions stands out as the technology with the highest recovery potential.

The state of the art has various examples of how these recovery methods function, such as U.S. Pat. No. 3,983,940, which describes a composition and a method of injection of a microemulsion in a reservoir for the recovery of oil. The proposed microemulsion contains oil, refined or crude, an aqueous phase (brine at concentration of 2.5%), and an orthoxylene sulfonate as surfactant.

Another example can be found in U.S. Pat. No. 4,008,769, which describes a method for advanced recovery of oil from a subterranean formation by the injection of a microemulsion made up of an aqueous phase containing neutralized organic acids extracted from the oil, as well as an oil and a co-surfactant.

U.S. Pat. No. 4,240,504 describes a method of advanced recovery of oil where two immiscible phases (one microemulsion and one aqueous) are injected simultaneously into the subterranean formation.

The state of the art in relation to the methods of advanced recovery of oil employing microemulsions is vast. However there is also a need for a technical solution for a composition of microemulsion that is economically viable for the recovery of heavy oils.

SUMMARY OF THE INVENTION

This invention describes a compound of microemulsion for the advanced recovery of heavy oil, made up of a mixture of:
a combination of a surfactant and co-surfactants;
an oil phase; and
an aqueous phase.

The interest in microemulsions is principally based on the capacity to dissolve hydrophilic and hydrophobic compounds, the large interfacial area and the ultra-low interfacial tension. Low energy is required for their preparation, since their formation is spontaneous and their characteristics can be controlled by temperature and salinity.

In a preferred method, a bank containing a compound of the microemulsion of this invention is injected into a reservoir containing heavy oils through injector wells followed by a bank of a polymer solution. Finally, the bank of polymer solution is displaced by means of an injection of water while the heavy oil is recovered through producing wells.

Injection of a microemulsion can be applied to a large variety of conditions of reservoirs, and in general is employed in all the locations where water injection is used, and also in those where water injection is not recommended due to the difficulty of mobility, such as in the case of reservoirs of heavy oils.

The composition of a microemulsion applied in accordance with the method described herein is capable of moving at least 40% of the residual oil contained in the reservoirs after the application of conventional recovery methods, thereby being able to increase the final recovery factor to values close to 80%. The field of application of this invention is reservoirs of heavy oils (having values below 22.3° API) in onshore and offshore fields.

BRIEF DESCRIPTION OF THE DRAWING

The composition of a microemulsion for advanced recovery of heavy oil, the subject of this invention, will be better perceived from the detailed description below. The description is provided merely as an example with reference to FIG. 1.

FIG. 1 illustrates the dispersion of the components of the microemulsion for advanced recovery of heavy oil.

DETAILED DESCRIPTION OF THE INVENTION

A microemulsion can be defined as a dispersion of droplets of a liquid (for example, an oil) in another immiscible liquid (for example, water) and stabilized by an interfacial film of surfactant molecules. The diameter of the drops of a microemulsion is in a range between 10 nm and 100 nm.

In general, in addition to the surfactant itself, the interfacial film comprises a co-surfactant, the function of which is to reduce the surface tension to values below the limits provided by the use of the surfactant alone. The dispersion thus formed is optically transparent and thermodynamically stable, not requiring the application of energy from, for example, shaking for the formation and maintenance of its characteristics. Also, the formation of a microemulsion is independent of the order in which components are mixed. However, it requires a high concentration of surfactant/co-surfactant, low surface tension, and an appropriate hydrophilic-lipophilic balance.

The recovery of oils by injection of water in reservoirs is a process very well known in the state of the art. It has low efficiency in reservoirs of heavy oils due to the difference between the mobilities of the water and the oil. With the addition of surfactant products, in the form of a microemulsion, recovery is improved as a result of the reduction of the interfacial tension and the alteration of the capacity of the porous medium to be wettened. But for this process to achieve its objective efficiently, certain parameters need to be met, including the stability and compatibility between the microemulsion and the fluids of the reservoir, the absorption of the surfactant in the porous medium, and the viscosity.

In this context, this invention describes a composition of a microemulsion for the advanced recovery of heavy oil, that is to say, oil with the American Petroleum Institute gravity (API) of less than 22.3° API, which comprises a mixture of the following components dispersed in accordance with FIG. 1:

a combination of surfactants (1) and co-surfactants (2);
an oil phase (3); and
an aqueous phase (4).

The surfactant (1) used can be made up of one or more substances which can be selected from among the following: an ethoxylated lauryl alcohol (ELA) and a sodium lauryl ether sulfate (SLES). The co-surfactant (2) used can be selected from n-butanol and sec-butanol.

The mass ratio between the co-surfactant (2) and the surfactant (1) to maintain the composition of a microemulsion stable in the presence of the salinity presented in a given oil reservoir from which recovery is required can vary from 0.5 to 1.0. The volume of the combination of surfactants (1) and co-surfactants (2) added in the composition may be between 15% and 30% of the total volume of the microemulsion composition.

The oil phase (3) present in the composition of the microemulsion comprises a fraction of hydrocarbons with boiling point in the range of kerosene and diesel. The oil phase (3) should have chemical properties similar to that of the oil to be recovered, to ensure its solubility.

By volume, the oil phase (3) is in a range between 10% and 30% of the total volume of the composition of microemulsion.

The aqueous phase (4) of the composition of the microemulsion may be made up of seawater or industrial water, depending on the availability and on the salinity desired for the microemulsion. The quantity of the aqueous phase (4) should be enough to complete 100% by volume of the composition of the microemulsion.

In accordance with the preferred methodology, a bank containing the composition of microemulsion of this invention is injected into a reservoir through injection wells followed by a bank of a polymer solution (e.g. polysaccharide) of molecular weight varying from 500 to 1,000,000. This bank of polymer solution operates to improve the coverage and to protect the microemulsion bank. Finally, the bank of polymer solution is displaced by the injection of water while the heavier oil is recovered through producer wells.

The bank containing the composition of microemulsion may be injected in volumes varying from 0.1 to 1 pore volume (PV). For a bank of polymer solution, 0.1 pore volume (PV) is sufficient to move the bank containing the composition of microemulsion and the bank of oil dis-absorbed from the porous medium by reduction of the surface tension.

The composition of the microemulsion for advanced recovery of heavy oil, applied in accordance with the method described in this invention, maximizes the efficiency of the recovery of oils in the band of values below 22.3° API, since it is an excellent solvent for complex organic compounds of high molecular weight such as, for example, asphaltenes and resins. This composition of the microemulsion may be applied in the most varied types of reservoirs, including arenitic and carbonatic reservoirs.

EXAMPLE

This following example is used to provide for the further understanding of the invention herein. The Example, however, does not represent the full scope of the invention.

The performance of the microemulsion composition in the process of the advanced recovery of heavy oils was assessed by physical simulation in a consolidated porous medium (plug) using two samples of oil, the first (Oil A) having 16.7° API and a viscosity of 267.3 mPa·s at 60° C., and the second (Oil B) having 19.7° API and a viscosity of 55.4 mPa·s at 60° C.

The method was carried out in the following steps:
a) saturation of a plug with water at 60° C., to determine the pore volume (PV);
b) saturation of the plug with oil until the residual water saturation ($S_{WR}$) is reached;
c) aging of the oil in the plug for 24 hours at 60° C.;
d) injection of seawater until the residual oil saturation ($S_{OR}$) is reached;
e) injection of 0.10 PV of microemulsion at the rate of 1 cm$^3$/min;
f) injection of 0.10 PV of a polymer solution of polysaccharide of high molecular weight, at concentration of 1,000 ppm, and rate of 1 cm$^3$/min; followed by
g) injection of seawater at the rate of 1 cm$^3$/min.

The volume of oil removed was quantified to assess the efficiency of the recovery of oil during the process of the injection of the microemulsion and to determine the oil recovery factor (RF).

Table 1 presents the results obtained in the test of the injection of the microemulsion in the porous medium.

TABLE 1

Results obtained in the recovery test in consolidated porous medium.

| Parameter | Symbol | Oil A | Oil B |
|---|---|---|---|
| Porous volume | PV | 17.73 cm$^3$ | 17.75 cm$^3$ |
| Absolute permeability - to air | $K_{ar}$ | 1,573 mD | 1,654 mD |
| Absolute permeability - to water | $K_w$ | 512 mD | 962 mD |
| Permeability to oil at irreducible water saturation | $K_{O(swr)}$ | 741.6 mD | 249.2 mD |
| Residual water saturation | $S_{wr}$ | 23.86% | 40.28% |
| Initial volume of water | $V_w$ | 4.21 cm$^3$ | 7.14 cm$^3$ |
| Initial saturation of oil | $S_{oi}$ | 76.14% | 59.72% |
| Initial volume of oil | $V_o$ | 13.5 cm$^3$ | 10.6 cm$^3$ |
| Time of aging of oil in the plug | $t_o$ | 24 hours | 24 hours |
| Injection of seawater up to $S_{OR}$ | | | |
| Temperature | T | 60° C. | 60° C. |
| Final saturation of water before the treatment* | $S_{wfa}$ | 60.52% | 68.45% |
| Final water volume before the treatment* | $V_{wfa}$ | 10.73 cm$^3$ | 12.15 cm$^3$ |
| Volume of oil recovered | $V_{o(disp)}$ | 6.5 cm$^3$ | 5.0 cm$^3$ |
| Final volume of oil before the treatment* | $V_{ofa}$ | 7.0 cm$^3$ | 5.6 cm$^3$ |
| Permeability to water at the residual oil saturation | $K_w(s_{or})$ | 28.5 mD | 2.89 mD |
| Recovery factor | FR | 48.1% | 47.2% |
| Injection of microemulsion | | | |
| Temperature | T | 60° C. | 60° C. |
| Pore volume displaced | $N_P$ | 0.10 | 0.10 |
| Final saturation of water after the treatment* | $S_{wfd}$ | 76.88% | 79.15% |
| Final water volume after the treatment* | $V_{wfd}$ | 13.63 cm$^3$ | 15.45 cm$^3$ |
| Final oil volume after the treatment* | $V_{ofd}$ | 4.10 cm$^3$ | 2.30 cm$^3$ |
| Volume of oil recovered in the treatment* | $V_{o(disp)}$ | 2.90 cm$^3$ | 3.30 cm$^3$ |
| Permeability to water at residual oil saturation | $K_w(s_{or})$ | 37.5 mD | 7.5 mD |
| Recovery factor based on initial oil | $FR_i$ | 21.5% | 31.1% |
| Recovery factor based on residual oil after injection of seawater | $FR_R$ | 41.4% | 58.9% |
| Final recovery factor (after injection of seawater and of microemulsion) | $FR_F$ | 69.6% | 78.3% |

*The Treatment referred to in Table 1 refers to the injection of: 0.10 PV of the composition of the microemulsion (27% surfactant/co-surfactant, 10% oil phase, and 63% aqueous phase); 0.10 PV of polymer solution (1,000 ppm in fresh water); and injection of water. This composition of microemulsion has a clean and transparent appearance, with a viscosity of 5.3 mPa·s at 60° C. The interfacial tension between the composition of the microemulsion and the sample of "oil A" is 0.01 dyne/cm.

As can be seen in Table 1, the recovery of oil by the method of injection of seawater resulted in a recovery factor of up to 48% of the oil from the porous medium, thus reaching its residual oil saturation. This recovery factor is a low value due to the unfavorable ratio of mobility arising from the viscosity of the oils. In similar tests with low viscosity oils, where the mobility factor is around 20, a recovery factor with water of the order of 60% to 70% is usually obtained. It was also found that when the mobility factor is high, the production of oil ends after the breakthrough, the moment at which the displacing fluid, in this case the water, reaches the production well and begins to only circulate.

To increase the recovery factor of the system, 0.10 PV of the microemulsion was injected, followed by 0.10 PV of the polymer solution, aiming to protect the microemulsion bank and also to improve the area covered. It should be noted that the polymer solution does not operate at the residual oil saturation. It was then seen that the injection of the microemulsion provided an additional recovery of 41% of the "oil A" contained in the porous medium. Considering the initial total volume of oil, this treatment resulted in recovery of 21%. Even better results were obtained for "oil B", where the microemulsion resulted in an additional recovery of 59%. These values are considered excellent, obtained with only 0.10 PV, since usually the recovery methods known in the state of the art used treatment volumes above 1 PV.

It should be noted that the effluent produced in this process is non-emulsioned water and oil. The outflowing fluids show that the residual oil produced has low interfacial tension, showing that the bank of polymer solution carries out its function of protecting the microemulsion bank.

The rapid mobilization of the oil, high efficiency, stability, and possibility of adjustment of viscosity by alteration of the concentration of surfactants/co-surfactants are the advantages of using this composition of microemulsion in the advanced recovery of heavy oil.

The descriptions given herein of the composition of the microemulsion and the method for the advanced recovery of heavy oil, e.g., for the band of values below 22.3° API, should be considered only as possible practical forms of applying the method: any particular characteristics introduced should be understood as facilitating understanding of the invention herein. Thus they should not be considered as limiting the invention.

We claim:

1. A microemulsion composition for advanced oil recovery of heavy oil comprising a mixture of:
   a) between 15% and 30% by volume based on the total volume of the microemulsion composition of a combination of surfactants and co-surfactants wherein the mass ratio between the co-surfactant and the surfactant vary from 0.5 to 1.0;
   b) between 10% and 30% by volume based on the total volume of the microemulsion composition of an oil phase; and
   c) an aqueous phase sufficient to complete 100% by volume of the microemulsion composition wherein the aqueous phase comprises at least one of the group consisting of seawater and industrial water.

2. The composition of claim 1, wherein the combination of surfactants and co-surfactants comprises at least one surfactant selected from the group consisting of an ethoxylated lauryl alcohol (ELA) and a sodium lauryl ether sulfate (SLES).

3. The composition of claim 1, wherein the combination of surfactants and co-surfactants comprises at least one co-surfactant selected from the group consisting of n-butanol and sec-butanol.

4. The composition of claim 1, wherein the oil phase comprises a fraction of hydrocarbons with boiling point in the range of kerosene and diesel.

5. A method for the advanced recovery of heavy oil, comprising the steps of:
   a) Making contact between a heavy oil contained in a reservoir and the microemulsion composition of claim 1 by means of injection in injector wells drilled in the reservoir from a bank containing the microemulsion composition which comprises a mixture of:
      i. A combination of surfactants and co-surfactants representing between 15% and 30% by volume of the total volume of the composition of microemulsion, where the mass ratio between the co-surfactants and the surfactants is between 0.5 and 1.0;
      ii. An oil phase representing between 10% and 30% by volume of the total volume of the microemulsion composition; and
      iii. An aqueous phase sufficient to complete 100% by volume of the composition of microemulsion;
   b) Displacing the bank containing the microemulsion composition by means of a subsequent injection of a bank of a polymer solution;
   c) Moving the bank of polymer solution by means of a subsequent injection of water;
   d) Recovering the heavy oil by means of producer wells drilled in the reservoir.

6. The method of claim 5, wherein the bank containing the microemulsion composition is injected in a range between 0.10 and 1 pore volume.

7. The method of claim 5, wherein the bank of polymer solution is injected up to 0.10 pore volume.

8. The method of claim 5, wherein the polymer solution comprises a polysaccharide having a molecular weight varying from 500 to 1,000,000.

* * * * *